United States Patent [19]
Olmstead

[11] 3,727,032
[45] Apr. 10, 1973

[54] DOCUMENT FORMAT

[76] Inventor: Charles Herbert Olmstead, 12 Otsego Road, Worcester, Mass. 01609

[22] Filed: Sept. 29, 1971

[21] Appl. No.: 184,822

Related U.S. Application Data

[63] Continuation-in-part of Ser. No. 56,185, July 10, 1970, abandoned, which is a continuation of Ser. No. 790,792, Jan. 13, 1969, abandoned.

[52] U.S. Cl. ..........235/61.12 R, 35/36, 340/146.3 Z, 340/146.3 A
[51] Int. Cl. ..........................G06k 1/00, G09b 11/04
[58] Field of Search ................340/146.3 Z, 146.3 A; 235/61.11 F, 61.12; 35/36, 37

[56] References Cited

UNITED STATES PATENTS

| | | | |
|---|---|---|---|
| 2,963,220 | 12/1960 | Kosten et al. | 340/146.3 A |
| 3,108,254 | 10/1963 | Dimond | 340/146.3 Z |

*Primary Examiner*—Thomas A. Robinson
*Attorney*—Sewall P. Bronstein et al.

[57] ABSTRACT

A document comprising a sheet of material having a plurality of rectangular areas adapted to be written on and defined by lines and two triangular shaped non-mark areas formed in each of the rectangular areas, the triangular areas positioned within this area so that their apices generally point towards each other and spaced apart from each other by a land area within said rectangular areas.

16 Claims, 3 Drawing Figures

DOCUMENT FORMAT

This application is a continuation-in-part of U.S. Pat. No. application Ser. No. 56,185 now abandoned which is itself a continuation of U. S. Pat. application Ser. No. 790,792 now abandoned.

BACKGROUND OF THE INVENTION

To date, data entry has been a vexing problem in computer installations. Conventional methods for data entry such as manually converting input data to a machine-readable format are expensive, labor-intensive, and time consuming. An alternative method to overcome these problems, at least partly, has been the development of optical character recognition machines (OCR). These machines can "read" source documents and automatically convert the data recorded on the document to a format that is directly usable by the computer without the need for manual intervention. With respect to handprinted data, present-day OCR systems can "read" the Arabic numbers zero through nine and four or five upper-case alphabetic characters.

OCR systems have been commercially available for approximately 15 years. It is estimated that of all the data input to computers, less than 5 percent is via OCR. Of this 5 percent, handprinted data is a small fraction, on the order of 1 percent. Given the fact that most input data originates as a handprinted record and that most of this data are Arabic numbers, it can be concluded that OCR has not been an overwhelming commercial success.

There are two main reasons why prior art OCR systems have had limited commercial acceptance. One reason is cost. Existing machines are quite expensive. Only those computer installations with very large volumes of data input are able to justify OCR on an economic basis. The second reason is the relatively poor accuracy with which handprinted characters are "read" by these machines. OCR systems have an error rate in the range of ¼ to ½ percent per character read automatically without intervention by the machine operator. (These errors are of two kinds: assigning an improper identification to a character — called misreads — and inability to identify a valid character — called rejects). Documents are usually invalid if one or more characters on it are "read" in error. The result is that document reject rates become excessive if there are more than 15 or 20 handprinted characters to be "read" per document.

Keypunched unit records can accommodate up to 80 characters per record. Because of this convention, most source documents have been designed to use as much of the tabulating card capacity as possible. The average source document has 40 to 60 characters that must be transformed to a machine readable format. Therefore, it can be seen that present-day OCR systems with their error rates are not suitable as a replacement for keypunching the average source document; the document reject rate would be about 10 times greater with OCR as compared with keypunching.

The proposed solution is a document format constructed in such a way that the basic objections to prior art OCR systems can be overcome.

The document should be usable by as large a population of people as possible in many varied kinds of environments wherein the data recording is performed. The document format should accommodate left-handed writers as well as right-handed writers. The document format should be compatible with the fact that people prefer to print in their habitual manner and will, even with training, revert to their habitual style from time to time. The document format should not require people to print in a highly stylized fashion. The above are the major human engineering aspects of the document format.

The document format should be constructed so that the OCR machine used to "read" it need not be complicated or expensive, nor should it preclude the ability to "read" automatically at a fairly rapid speed. Lastly, the document format should be such that characters can be "read" with as little ambiguity and error as possible —preferably comparable with conventional data entry methods such as keypunching and verifying.

BRIEF DESCRIPTION OF THE INVENTION WITH REFERENCE TO THE PRIOR ART

Figure 1:
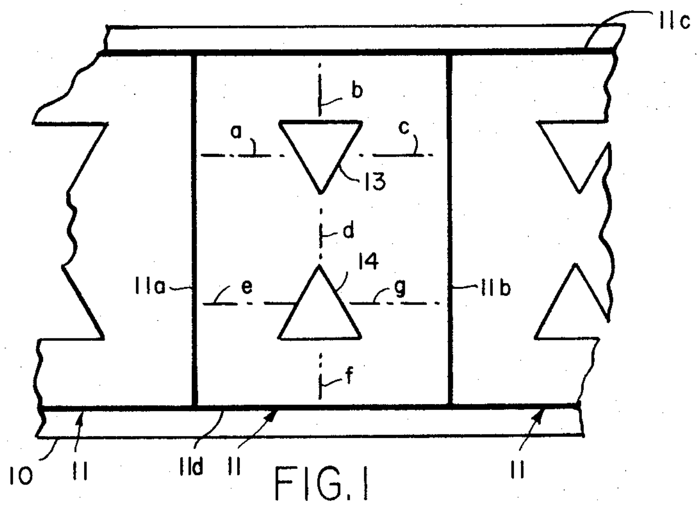
FIG. 1 is a top view with parts broken away of a plurality of character boxes according to the invention showing scanning lines.
Figure 2:
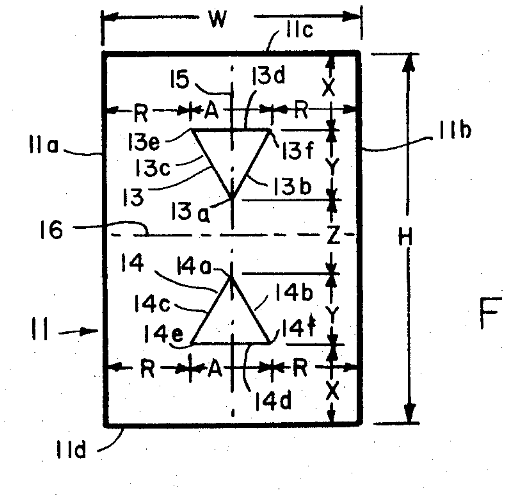
FIG. 2 is a top enlarged view of one of the character boxes illustrated in FIG. 1.

The document format of the invention is illustrated in FIGS. 1 & 2. The prescribed printing area constraint is a rectangular shaped box, referred to hereafter as a character box. The other constraint is a pair of triangular shaped isosceles triangles as non-mark areas situated within the character box such that certain characters can be printed within the character box and around and/or between the non-mark areas. FIG. 1 shows the characters that can be printed uniquely on this document format.

The permissible writing area, i.e., the area within the character box and surrounding the non-mark areas is optically scanned in seven paths, *a*, *b*, *c*, *d*, *e*, *f*, and *g*, as shown in FIG. 1. The relationship between the shape, size, and positions of the non-mark areas with respect to the boundaries of the character box remind and restrain the writer such that the marking strokes used to print characters —horizontal, vertical, diagonal, or small circles either single or in combination —either cross or do not cross the seven scanning paths in mutually exclusive patterns for each character. (Note: the scanning paths are not visible to the writer; these paths are scanned by the OCR machine during the "reading" phase of operation).

An important feature of the seven scanning paths is that they are basically formed by two lines intersecting a third at right angles. The top line is composed of path *a*, a segment of the top non-mark area, and path *c*. The vertical line is composed of path *b*, a segment of the top non-mark area, path *d*, a segment of the bottom non-mark area, and path *f*. The bottom line is composed of path *e*, a segment of the bottom non-mark area, and path *g*. The mechanism required to generate three lines and to segment them into appropriate scanning paths will be less expensive and less complicated than a mechanism required to generate seven discrete paths.

Some prior art using non-mark area constraints have attempted to overcome certain limitations of their invention by positioning their scanning paths at unusual angles. For example, U. S. Pat. No. 3,108,254 shows the upper left-hand path (our path *a*) sloping downward to the left and the lower left-hand path (our path *e*) sloping upward to the left and the upper center path (our bath *b*) tilted to the right.

The average document reject rate for conventional data entry methods such as keypunching and verifying is 2 percent, i.e., 2 percent of the records have one or more errors. The average record has, say, 50 characters. Therefore, to maintain an acceptable document reject rate, there can be not more than one error per 2,000 characters. An OCR document format with constraints must at least approach the performance level of conventional methods to be commercially successful.

Prior art non-mark area constraints such as guide dots or small circles (see U. S. Pat. No. 3,142,039) have not been successful commercially because they can not inhibit certain kinds of printing strokes. Certain characters can occasionally be printed around guide dots such that they would be misread by a machine. Despite training and instructions, some writers —particularly if drawn from a large population, which is a requisite for commercial success —will print the character 2 when dots or circles are used in a manner such that the mark crosses all seven scanning paths and would, consequently, be identified as the character eight. The numerals 3, 6, and 9 may also cross all seven scanning paths and would be identified as the character eight. In addition, a 5 may cross the same paths as the character six with a top loop. In addition, a 4 which has a closed top may be written because the guide dot does not provide sufficient separation between what should be two vertical marks and, consequently, would be read as the character nine. The character C may be written and then read as the character zero because if made with a top loop and bottom loop, paths *c* and *g* would be intersected.

It is important to note that all of the above mentioned examples are habitual for many people and the writers could reasonably expect them to be valid renditions. The guide dots provide no means for indicating to the writer that the characters have been made incorrectly from the reading machine's modus operandi.

It is obvious that the likelihood of an erroneous character 4 with a closed top would be reduced by increasing the diameter of the guide dots. But larger guide dots will not necessarily inhibit writers from extending the bottom and top loops of other characters. In addition, larger guide dots given the same sized character box will reduce the areas available for vertical and horizontal marks and will impede diagonal marks. Characters 2, 8, R, N, X, 1 and 7 are examples of characters that are composed of diagonal marks. Most writers would be inconvenienced by not being able to print a straight diagonal mark. The conclusion is that circular shaped constraints in general are not sufficient to impede writers from extending the top and bottom loops of some characters and that small circles cannot prevent some writers from closing the top of the character 4 and large circles inhibits closing the top of the character 4 but introduces an unacceptable impediment to diagonal marks.

Other prior art disclosing non-mark areas show squares or rectangles instead of guide dots. This format, too, has not been commercially successful because it imposes the necessity for so-called block style printing. Block style printing is not the normal printing style for most people. Most writers prefer to use diagonal and circular strokes in printing characters 2, 3, 5, 6, 8 and 9 for example.

From the above, it is clear that the shape of the non-mark area constraints and their size and position with respect to the character box is critical given the requirements for commercial success, to wit: enabling a large population of writers who have many various kinds of printing styles to print in a manner that deviates as little as possible from their habitual manner while at the same time inhibiting them from printing certain characters in a way that they would be incorrectly identified by an automatic reading device.

DESCRIPTION OF THE PREFERRED EMBODIMENT

Reference should now be had to FIGS. 1 and 2 for a detailed description of the preferred embodiment of the invention.

At 10 there is shown a document comprising a sheet of material such as cardboard, paper or the like on which there is provided a plurality of character boxes 11 for which numbers and letters of the alphabet may be printed. The character boxes can be arranged in rows or columns on the document. The character box is rectangularly shaped, which is the only shape permitted for the purposes of this invention and is defined by two side lines 11*a* and 11*b*, a top line 11*c* and a bottom line 11*d*. The box has a vertical height H and a horizontal width W. The box preferably has a W/H ratio of 0.5 to 1.0 with a ratio of 0.6 to 0.75 being most preferred. The ratio is selected to achieve a box of dimensions to accommodate printing of most persons without permitting exaggeration in character formation in any one direction.

Within each box there is provided two non-mark constraints 13 and 14 in the shape of isosceles triangles (which includes equilateral triangles). The non-mark areas may be blackened areas or shellacked areas and most preferably are holes or apertures that a pencil cannot be drawn across or through the areas. This would not be the case if a blackened or shellacked non-mark area was used.

The triangles 13 and 14 are positioned within the box 11, such that the apices 13*a* and 14*a* between the equally long edges 13*b* and 13*c* and 14*b* and 14*c* respectively point towards each other and lie on an imaginary vertical line 15 dividing the box in half as well as the triangles 13 and 14 in half. The triangles are also preferably positioned symetrically within the box with respect to an imaginary horizontal line 16 dividing the box in half.

Each triangle has a height Y measured from a bottom edge 13*d* and 14*d* thereof respectively which are positioned parallel to the bottom and top lines 11*c* and 11*d* respectively, of one-third to one-eighth of H, and is most preferably equal to one-fourth to one-sixth of H.

In addition, the distance between each of the edges 13*d* and 14*d* and the bottom and top lines 11*c* and 11*d* closest thereto is selected as X and furthermore the distance Z between the two apices 13*a* and 14*a* pointing towards each other is equal to 2X to X/2 and most preferably three-fourths to five-fourths of X. In the most preferred case X=Y=Z=H/5 to achieve the ultimate found to date in print reading reliability.

It has also been found that the length of the bottom edges 13*d* and 14*d* of the triangles 13 and 14 which are defined as A should be equal to 2R to R/2 where R is the distance between the end points 13*e* and 13*f* and 14*f* to the side lines 11*a* or 11*b* closest thereto. Preferably the A is equal to 3/4R to 5/4R and more preferably R=Y and most preferably R=X=Y=Z. In this case the triangles 13 and 14 are both equilateral triangles. In practice it has been found that the box width W can be 3/16 inch to ⅜ with a preferred width of ¼ and the box height H can range ¼ inch to ½ with the preferred height of ⅓ as long as the aforementioned W/H ratio is maintained.

Most preferably, R, X, Y and Z should at all times be greater than or equal to one thirty-second inch and less than or equal to one-eighth inch in order to accommodate pencil marks and at the same time provide sufficient constraint to prevent sloppy printing to a degree to cause errors in readout.

Figure 3:
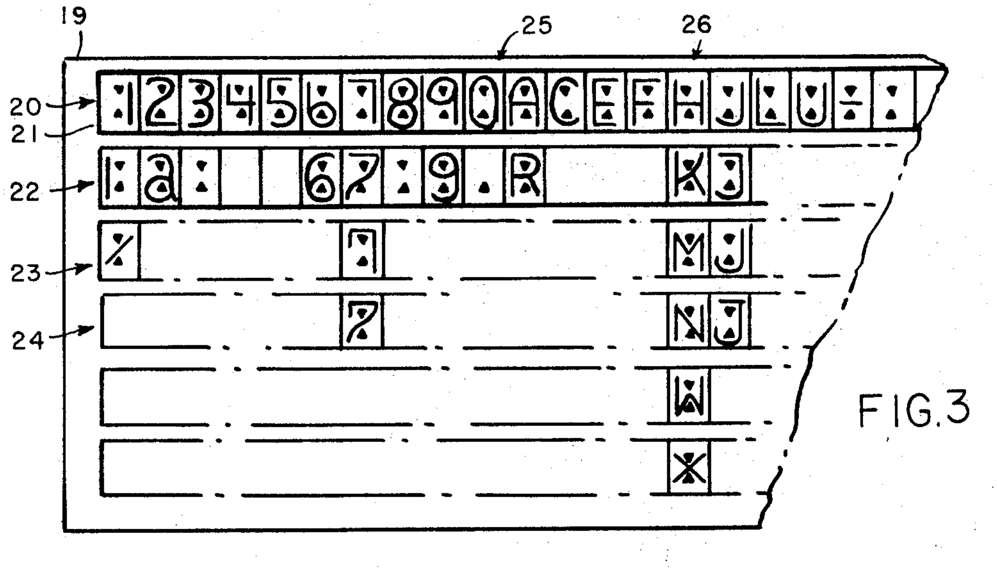
FIG. 3 illustrates the manner in which data numerical or upper case selected letters, may be printed in the character boxes.

In FIG. 3 there is shown a card 19 with the document format of the invention.

The top row 20 of character boxes 21 illustrates the numbers and selected letters of the alphabet which may be printed thereon and detected utilizing the scanning paths shown as *a–g* in FIG. 1. Rows 22–24 illustrate other ways of writing the numbers 1, 2, 6, 7, 9 and the letter J while still being able to read the fact that these are the numbers 1, 2, 6, 7, 9 and J. Columns 25 and 26 illustrate other alphabetic letters which may be used in place of A or H if a different code is desired.

As will be observed, the document format of this invention when used with a suitable detector scanning along paths *a–g* as shown in FIG. 1 is capable of unambiguously reading printed numerals 0–9 and selected alphabetic letters. This is accomplished in this invention by providing a document format with sufficient constraints to insure that hand printed numerals or letters will be printed in a manner to insure accuracy of readout.

I claim:

1. A document format comprising a sheet of material having at least one rectangular character box adapted to be written in on the material confined therein, the rectangular box defined by lines, the vertical height of the box being H and the horizontal width of the box being W, with the ratio of W/H = 0.5 to 1.0, the box having two sides and a top and bottom defined by the lines located thereabout, two isosceles triangles positioned in the box as non-mark areas with the apices between the equal edges of the triangles pointing towards each other and lying on an imaginary vertical line dividing the box and triangles in half, the triangles also positioned symetrically within the box with respect to an imaginary horizontal line dividing the box in half, each triangle being of height measured from a bottom edge thereof parallel to the bottom and top lines of the box being defined as Y with Y being equal to one-third to one-eighth of H, the distance between said bottom edge of each of the triangles and the bottom and top lines respectively of the box being defined as X, and the distances between the two apices pointing towards each other being defined as Z and being equal to 2X to 1/2X, the length of bottom edges of the triangles being defined as A, and the distances between the end points of bottom edges and the sides of the box both being equal and defined as R with A being equal to 2R to R/2.

2. A document format according to claim 1 in which the non-mark areas are apertures.

3. A document format according to claim 2 wherein the ratio of W/H is 0.6 to 0.75.

4. A document format according to claim 2 wherein Y is equal to one-fourth to one-sixth of H.

5. A document format according to claim 2 wherein Z is equal to three-fourths to five-fourths of X.

6. A document format according to claim 2 wherein A is equal to three-fourths to five-fourths R.

7. A document format according to claim 2 in which the triangles are equilateral triangles and R=X=Z=Y.

8. A document format according to claim 2 in which R, X, Z and Y ≧ 1/32 inch, and wherein W is three-sixteenths inch to three-eighths inch and H is one-fourth inch to one-half inch.

9. A document format according to claim 8 in which R, X, Z and Y ≦ ⅛ inch.

10. A document format according to claim 1 wherein Y is equal to one-fourth to one-sixth of H.

11. A document format according to claim 10 in which Z is equal to three-fourths to five-fourths X.

12. A document format according to claim 11 in which A is equal to three-fourths to five-fourths R.

13. A document format according to 12 in which the triangles are equilateral and R=X=Z=Y.

14. A document format according to claim 13 in which R, X, Z and Y ≧ 1/32 and R, X, Z and Y ≦ ⅛ inch.

15. A document format according to claim 14 in which W is three-sixteenths inch to three-eighths inch and H is one-fourth inch to one-half inch.

16. A document format according to claim 15 in which the non-mark areas are holes extending through the document format.

* * * * *